(12) United States Patent
Somanath et al.

(10) Patent No.: US 10,475,186 B2
(45) Date of Patent: Nov. 12, 2019

(54) SEGMENTATION OF OBJECTS IN VIDEOS USING COLOR AND DEPTH INFORMATION

(71) Applicant: INTEL CORPORATION, Santa Clara, CA (US)

(72) Inventors: Gowri Somanath, Santa Clara, CA (US); Jiajie Yao, Shanghai (CN); Yong Jiang, Shanghai (CN)

(73) Assignee: Intel Corportation, Santa Clara, CA (US)

( * ) Notice: Subject to any disclaimer, the term of this patent is extended or adjusted under 35 U.S.C. 154(b) by 449 days.

(21) Appl. No.: 15/190,784

(22) Filed: Jun. 23, 2016

(65) Prior Publication Data

US 2017/0372479 A1 Dec. 28, 2017

(51) Int. Cl.
*G06K 9/00* (2006.01)
*G06T 7/11* (2017.01)
(Continued)

(52) U.S. Cl.
CPC ............... *G06T 7/11* (2017.01); *G06T 7/136* (2017.01); *G06T 7/143* (2017.01); *G06T 7/174* (2017.01);
(Continued)

(58) Field of Classification Search
CPC . G06T 7/11; G06T 7/136; G06T 5/003; G06T 5/002; G06T 2207/20112;
(Continued)

(56) References Cited

U.S. PATENT DOCUMENTS

| 8,629,899 B2* | 1/2014 | Raveendran | ....... H04N 13/0003 345/419 |
| 8,878,912 B2* | 11/2014 | Raveendran | ......... H04N 21/816 348/42 |

(Continued)

FOREIGN PATENT DOCUMENTS

JP 02015073273 A * 4/2015 ............. H04N 13/00

OTHER PUBLICATIONS

"Mixture Model", retrieved from the Internet: https://en.wikipedia.org/wiki/Mixture_model#Gaussian_mixture_model, 14 pages, (Jun. 16, 2016)

(Continued)

*Primary Examiner* — Aaron W Carter
(74) *Attorney, Agent, or Firm* — Finch & Maloney PLLC

(57) ABSTRACT

Techniques are provided for segmentation of objects in video frames. A methodology implementing the techniques according to an embodiment includes receiving image frames, including an initial reference frame, and receiving a mask to outline a region in the reference frame that contains the object to be segmented. The method also includes calculating Gaussian mixture models associated with both the masked region and a background region external to the masked region. The method further includes segmenting the object from a current frame based on a modelling of the pixels within an active area of the current frame as a Markov Random Field of nodes for cost minimization. The costs are based in part on the Gaussian mixture models. The active area is based on the segmentation of a previous frame and on an estimation of optical flow between the previous frame and the current frame.

25 Claims, 10 Drawing Sheets
(4 of 10 Drawing Sheet(s) Filed in Color)

(51) Int. Cl.
*G06T 7/136* (2017.01)
*G06T 7/143* (2017.01)
*G06T 7/174* (2017.01)

(52) U.S. Cl.
CPC ............... *G06T 2207/10016* (2013.01); *G06T 2207/10024* (2013.01); *G06T 2207/10028* (2013.01); *G06T 2207/20112* (2013.01)

(58) Field of Classification Search
CPC . G06T 2207/10028; G06T 2207/10024; G06T 2207/10016
USPC ........ 382/164, 162, 154, 171, 173; 345/419; 348/42, 43, 46, 51, E13
See application file for complete search history.

(56) References Cited

U.S. PATENT DOCUMENTS

| | | | | |
|---|---|---|---|---|
| 9,083,958 | B2* | 7/2015 | Martinez Bauza | H04N 13/026 |
| 9,131,279 | B2* | 9/2015 | Raveendran | H04N 21/816 |
| 9,576,340 | B2* | 2/2017 | Pajak | H04N 19/46 |
| 9,639,943 | B1* | 5/2017 | Kutliroff | G06T 17/00 |
| 9,741,125 | B2* | 8/2017 | Baruch | G06T 7/187 |
| 2005/0094879 | A1* | 5/2005 | Harville | G06K 9/00201 |
| | | | | 382/209 |
| 2006/0285747 | A1* | 12/2006 | Blake | G06K 9/00234 |
| | | | | 382/180 |
| 2007/0237393 | A1* | 10/2007 | Zhang | G06K 9/38 |
| | | | | 382/173 |
| 2010/0111370 | A1* | 5/2010 | Black | G06K 9/00369 |
| | | | | 382/111 |
| 2010/0208987 | A1* | 8/2010 | Chang | G06K 9/342 |
| | | | | 382/165 |
| 2011/0038536 | A1* | 2/2011 | Gong | G06T 7/11 |
| | | | | 382/164 |
| 2013/0129205 | A1* | 5/2013 | Wang | G06K 9/6278 |
| | | | | 382/164 |
| 2014/0341464 | A1* | 11/2014 | Fan | G06T 5/008 |
| | | | | 382/154 |
| 2015/0055821 | A1* | 2/2015 | Fotland | G06K 9/3241 |
| | | | | 382/103 |
| 2015/0249791 | A1 | 9/2015 | Somanath et al. | |
| 2016/0171706 | A1* | 6/2016 | Somanath | G06T 7/11 |
| | | | | 382/154 |
| 2016/0180195 | A1* | 6/2016 | Martinson | G06K 9/6256 |
| | | | | 382/103 |
| 2017/0124717 | A1* | 5/2017 | Baruch | G06T 7/187 |
| 2017/0126968 | A1* | 5/2017 | Somanath | H04N 13/207 |
| 2017/0228940 | A1* | 8/2017 | Kutliroff | G06T 19/20 |
| 2017/0256065 | A1* | 9/2017 | Wu | G06T 7/215 |
| 2017/0278289 | A1* | 9/2017 | Marino | G06T 7/44 |
| 2017/0294210 | A1* | 10/2017 | Abramson | G06K 9/00765 |
| 2017/0337693 | A1* | 11/2017 | Baruch | G06T 7/168 |
| 2017/0358092 | A1* | 12/2017 | Bleibel | G06T 7/194 |
| 2018/0137625 | A1* | 5/2018 | Somanath | G06T 7/11 |
| 2018/0150955 | A1* | 5/2018 | Takeda | G06K 9/00 |

OTHER PUBLICATIONS

"Expectation Maximization", retrieved from the Internet: http://docs.opencv.org/2.4/modules/ml/doc/expectation_maximization.html, 6 pages, (Jun. 16, 2016).

"Bayesian Information Criterion", retrieved from the Internet: https://en.wikipedia.org/wiki/Bayesian_information_criterion, 4 pages, (Jun. 16, 2016).

Hickson, S., et al., "Efficient Hierarchical Graph-Based Segmentation of RGBD Videos", IEEE Conference on Computer Vision and Pattern Recognition (CVPR), 2014, 8 pages.

U.S. Appl. No. 14/570,941, filed Dec. 15, 2015, 52 pages.

International Application No. PCT/CN2015/078959, filed May 14, 2015, 50 pages.

* cited by examiner

Reference
Frame
202

Color Component
204

Depth Component
206

Mask
208

SEGMENTATION OF OBJECTS IN VIDEOS USING COLOR AND DEPTH INFORMATION

BACKGROUND

Many video editing and special effect applications require segmentation of one or more objects from video image frames. Examples of such editing and special effects operations include image background replacement, video composition, and cinemagraph generation (where the relative playback speed of one or more objects is changed). Additional video application examples that require object segmentation include scene understanding tasks such as object tracking and recognition. In all such cases, the quality of the object segmentation is generally important to the final product. Traditionally, artists have used frame by frame manual or semi-automatic techniques provided by photo editing tools. Such tools can be expensive, however, and oftentimes require relatively advanced training and skill on the part of the user. Additionally, these techniques tend to be not well suited for use on mobile devices, which have become a popular mechanism for video capture and sharing on social media, but tend to be more limited in processing capability and memory capacity.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Figure 1:
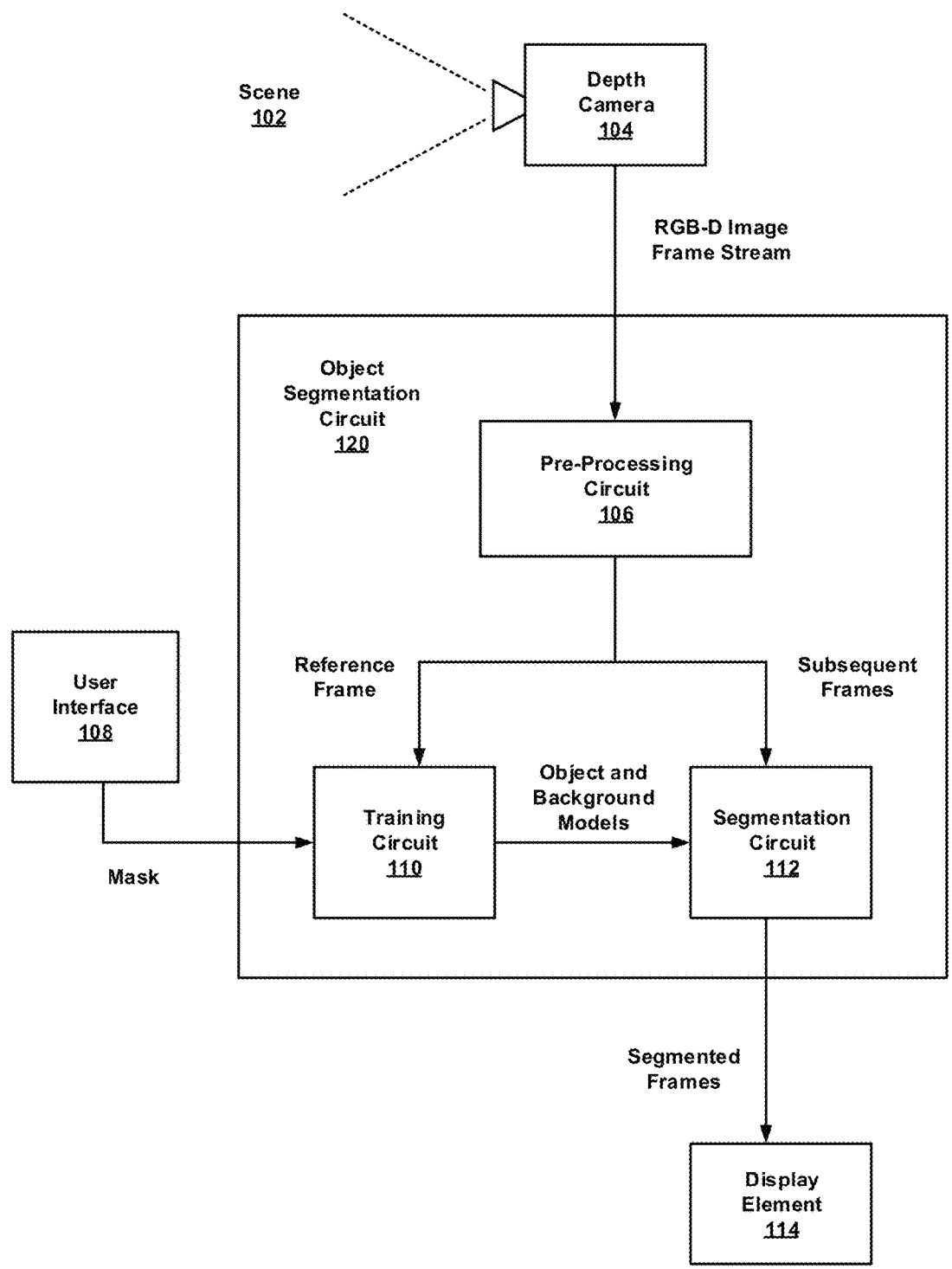
FIG. 1 is a top level block diagram of an implementation of an object segmentation system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for segmentation of objects, in videos comprising a sequence of color and depth image frames. Such image frames may be generated, for example, by a depth camera or 3D camera or a multi-camera system from which both color (red-green-blue or RGB) pixels and depth pixels may be obtained. Such images are referred to herein as RGB-D images. The techniques can be used, for example, to provide a framework for object segmentation in RGB-D videos from camera systems such as Intel® RealSense™ and RealSense™ Snapshot, although any RGB-D image generating systems can be used. The techniques are particularly useful in the context of video editing and creative video effects applications, which typically require good segmentation of one or more objects. Such applications include, for example, background replacement, cinemagraphs (where the relative playback speed of one or more objects within the overall frame content is changed), video composition, and scene understanding tasks such as object tracking and recognition. The disclosed techniques provide for a relatively efficient and automated segmentation process that does not require extensive user knowledge or skill, relative to typical video or image editing applications.

In accordance with an embodiment, the disclosed techniques can be implemented, for example, in a computing system or an image capture and processing system, or a software product executable or otherwise controllable by such systems. The system or product is configured to operate on a sequence of RGB-D image frames that includes an initial reference frame. The reference frame is used for training of the system. Additionally, a user provided (or automatically detected) mask serves to coarsely outline a region in the reference frame that contains the object to be segmented. This mask serves as a starting point for segmentation on subsequent frames, as well as the reference frame. The training operation is performed on the reference frame, and includes the calculation of Gaussian mixture models associated with both the masked region and a background region (external to the masked region). The object of interest may then be segmented from each frame based on a modelling of the pixels, as a Markov Random Field (MRF) of graph nodes for cost minimization, as will be explained in greater detail below. The costs are based in part on the Gaussian mixture models. The MRF modelling may be limited to an active area within that frame, in which the object is likely to reside. A determination of the active area is based on the segmentation results of a previous frame and on an estimation of optical flow between the previous frame and the current frame. Once an object has been properly segmented using the techniques provided herein, that object can then be readily acted on (e.g., removed, modified, replaced, animated, isolated for purposes of generating a cinemagraph, to name a few example actions).

The techniques described herein may allow for reduced computational overhead and improved real-time performance, compared to existing methods, given that computations are limited to an active area of each frame, according to an embodiment. Additionally, these techniques can be implemented on a broader range of computing platforms due to the reduced processing and memory requirements and the relative automation of the process. Such platforms may include, for example, a mobile device such as a tablet or smartphone that includes a depth camera or can receive images from a depth camera. These techniques may further be implemented in hardware or software or a combination thereof.

Figure 3:
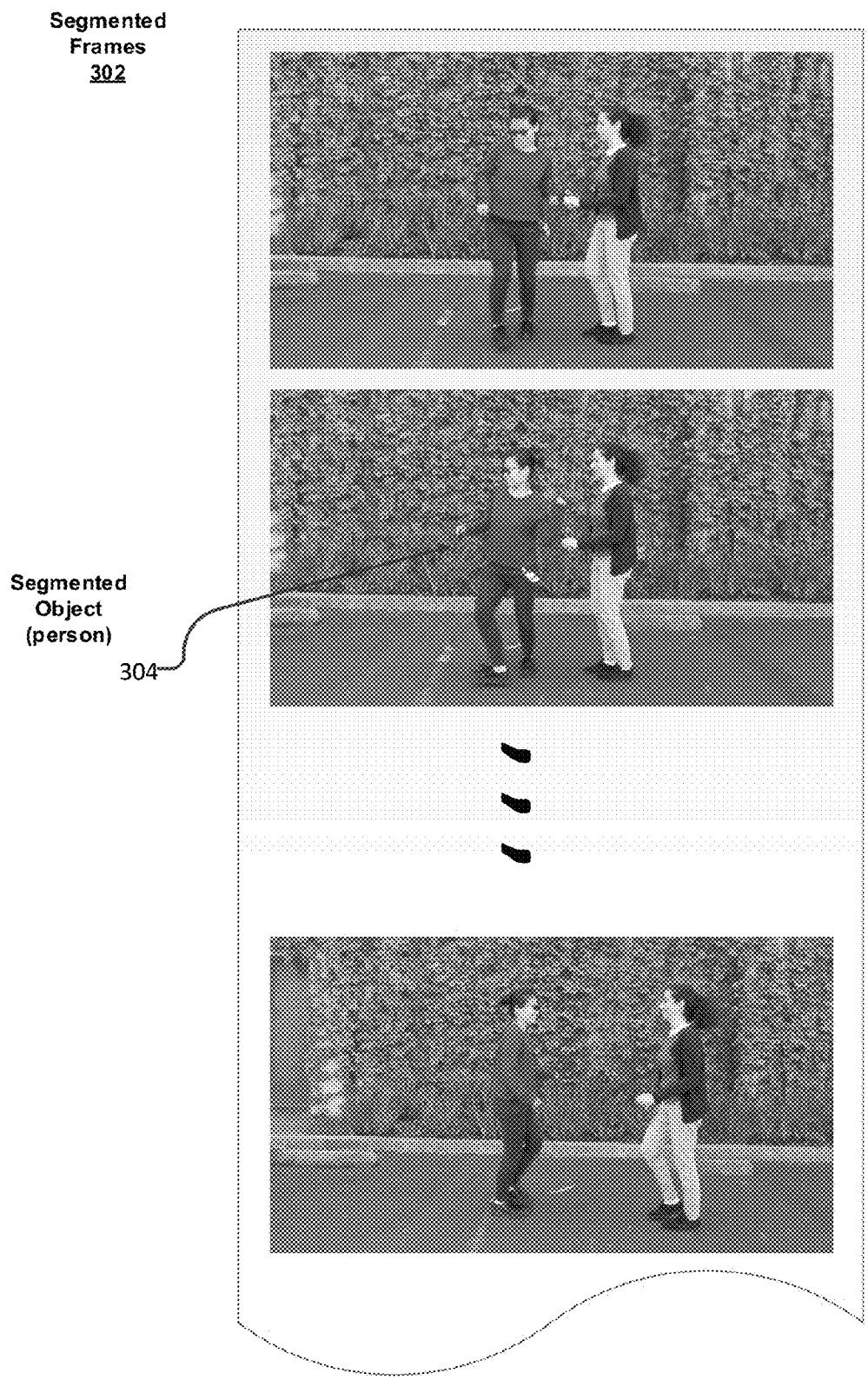
FIG. 3 illustrates examples of segmented objects in frames, in accordance with certain embodiments of the present disclosure.

FIG. 1 is a top level block diagram 100 of an implementation of an object segmentation system, configured in accordance with certain embodiments of the present disclosure. A depth camera 104 is configured to generate an RGB-D image frame stream (e.g., a video sequence) of a scene 102. The scene may encompass any subject matter including people, objects of interest, and background regions. The RGB-D image frames are provided to an object segmentation circuit 120 which is configured to detect and segment objects of interest from the image frames. In some embodiments, the object segmentation circuit may generate an output sequence of segmented frames, as illustrated in FIG. 3, where the segmented object of interest (a person 304) is outlined in red or otherwise delineated in any convenient manner. The segmented frames may be presented to a user or operator of the system through a display element 114 or other suitable mechanism.

The object segmentation circuit 120 is shown to include a pre-processing circuit 106, a training circuit 110, and a segmentation circuit 112, the operations of which will be described in greater detail below. At a high level, however, the pre-processing circuit 106 is configured to reduce noise in the received RGB-D image frames, and the training circuit 110 is configured to apply an object mask to an initial reference image frame to estimate statistical characteristics of the object versus non-object (or background) regions of the image. These characteristics, which in some embodiments take the form of Gaussian mixture models for the object and background, provide a starting point for the segmentation circuit 112, as it operates on the reference and subsequent image frames. The segmentation circuit 112 is configured to apply a 2-label (e.g., object/background) segmentation technique to an active area in each frame. The 2-label segmentation technique is based on modelling of pixels (or, in some embodiments, groups of pixels) as Markov Random Field (MRF) nodes subject to cost minimization using alpha-expansion.

Figure 2:
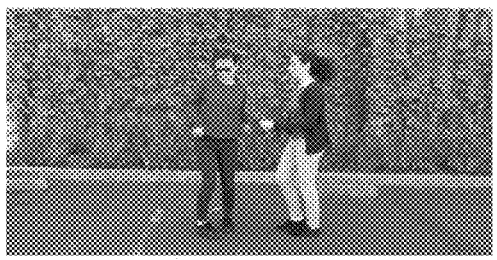
FIG. 2 illustrates an example reference image frame and associated mask, in accordance with certain embodiments of the present disclosure.
Figure 2:
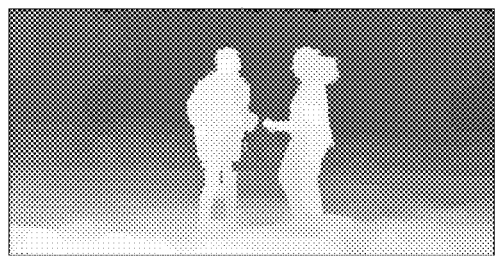
Figure 2:
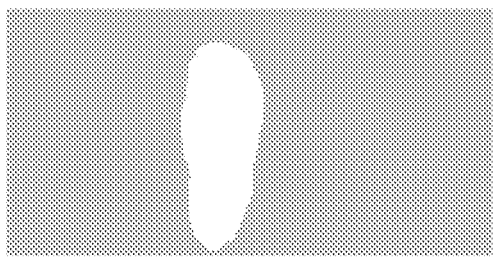

Additionally, in some embodiments, a user interface 108 is configured to enable the user or operator of the system to provide the object mask, an example of which is shown as 208 in FIG. 2. The user interface may include a mouse, pen, or similar device providing the capability for the user to draw a coarse or approximate outline around the object to be segmented. In some embodiments, the object mask may be determined in an automatic fashion. For example, if the object to be segmented is a face or a person, then known face detection (or human detection) systems, in light of the present disclosure, may be used to generate the object mask.

FIG. 2 illustrates an example reference image frame and associated mask, in accordance with certain embodiments of the present disclosure. The reference image frame 202 may typically be the first frame of a video sequence, or the first frame of a sub-sequence of frames for which segmentation is desired. In general, however, the reference frame may be any frame from the sequence. The reference frame 202 is shown to include a color (RGB) component 204 and a depth component 206. The other (non-reference) image frames of the video sequence similarly comprise an RGB and depth component. An example mask 208 is also shown. The mask 208 is generally provided by the user, although this is not required, and serves to provide a relatively coarse outline around the object of interest which is to be segmented. In this case, the mask 208 is shown to roughly encircle the person on the left in the reference frame image 202.

FIG. 3 illustrates examples of segmented objects in frames processed in accordance with certain embodiments of the present disclosure. In some embodiments, the object segmentation circuit is configured to generate an output sequence of segmented frames 302, as shown. The segmented object of interest, the person 304 on the left, is outlined in red in each output image frame 302. In some embodiments, other methods of indicating object segmentation may be employed. As one example, the segmented object may be removed from each output image frame, leaving a blank area or hole in its place. As another example, the segmented object may be preserved while the remainder of the output image is erased form each output image frame.

Figure 4:
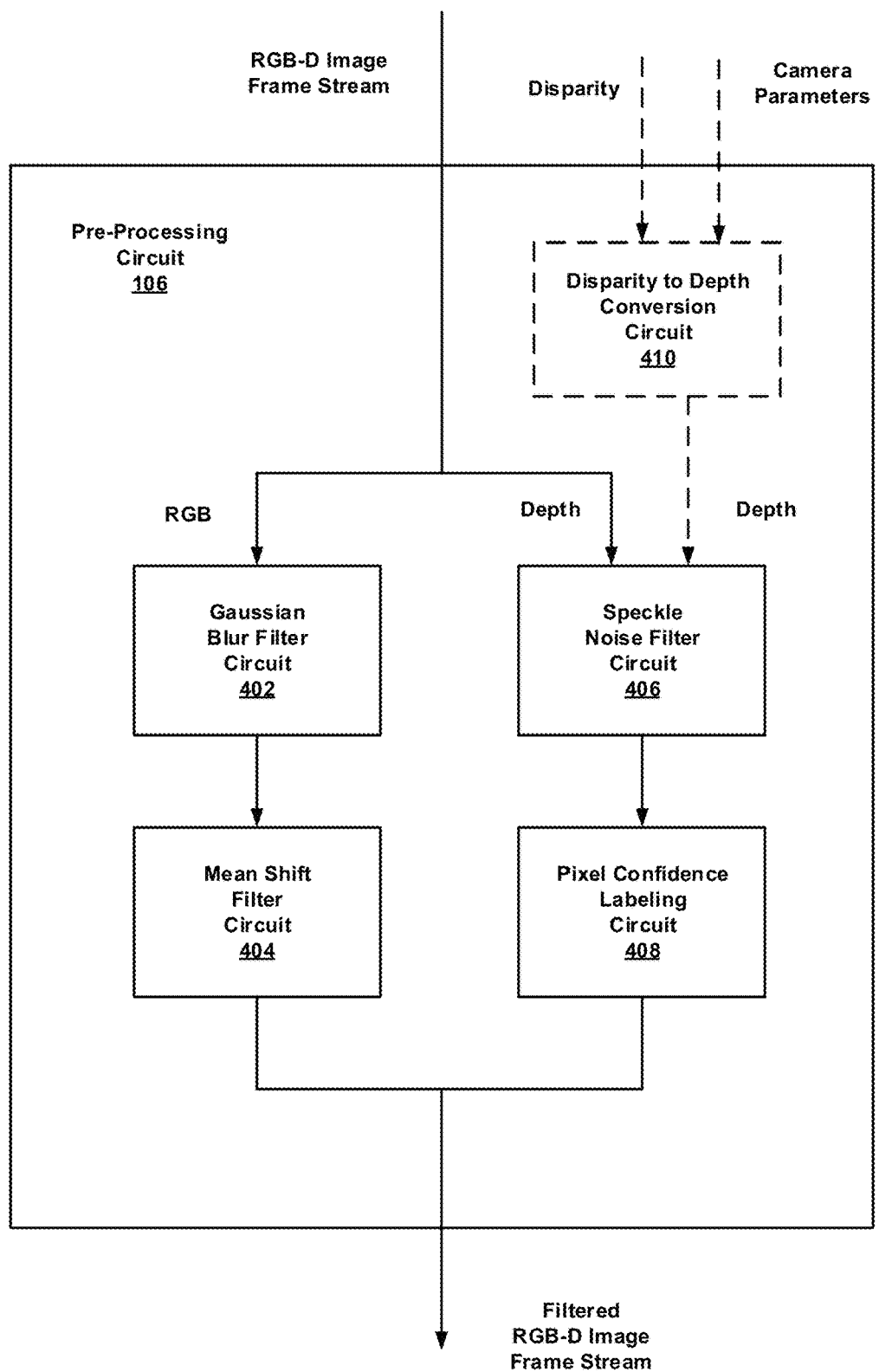
FIG. 4 is a more detailed block diagram of an image pre-processing circuit, configured in accordance with certain embodiments of the present disclosure.

FIG. 4 is a more detailed block diagram of an image pre-processing circuit 106, configured in accordance with certain embodiments of the present disclosure. The image pre-processing circuit 106 is shown to include a Gaussian blur filter circuit 402, a mean shift filter circuit 404, a speckle noise filter circuit 406, and a pixel confidence labeling circuit 408.

In some embodiments, an optional disparity to depth conversion circuit 410 is also provided. For systems employing 3D cameras that provide disparity values instead of depth values, disparity to depth conversion circuit 410 is configured to generate depth values based on the inverse relationship between depth and disparity. For example:

$$\text{depth} = (\text{camera focal length} * \text{camera baseline})/\text{disparity}$$

where the camera focal length and baseline are known or supplied camera parameters.

The Gaussian blur filter circuit 402 may be configured to apply a low pass filtering or smoothing effect to reduce noise in the color frame components of the image frames. The mean shift filter circuit 404 may be configured to quantize the color space of the color frame components for additional smoothing. The speckle noise filter circuit 406 may be configured to reduce noise in the depth frame components of the image frames.

The pixel confidence labeling circuit 408 may be configured to determine confidence values associated with pixels of the depth frame components, and to label depth pixels that are associated with confidence values below a threshold value, to indicate that they are of unknown depth. In some embodiments, the confidence of the depth/disparity value may be provided directly by the camera system. In other embodiments, the confidence value may be calculated based on heuristics. These heuristics may include spatial constraints such as limited variability within a small block of pixels, or limited range of values based on sensor performance characteristics (e.g., a minimum and maximum depth range of the camera). So, for example, if a depth pixel value indicates a depth that exceeds the camera's operational depth range, that pixel can be labeled as unknown depth.

Figure 5:
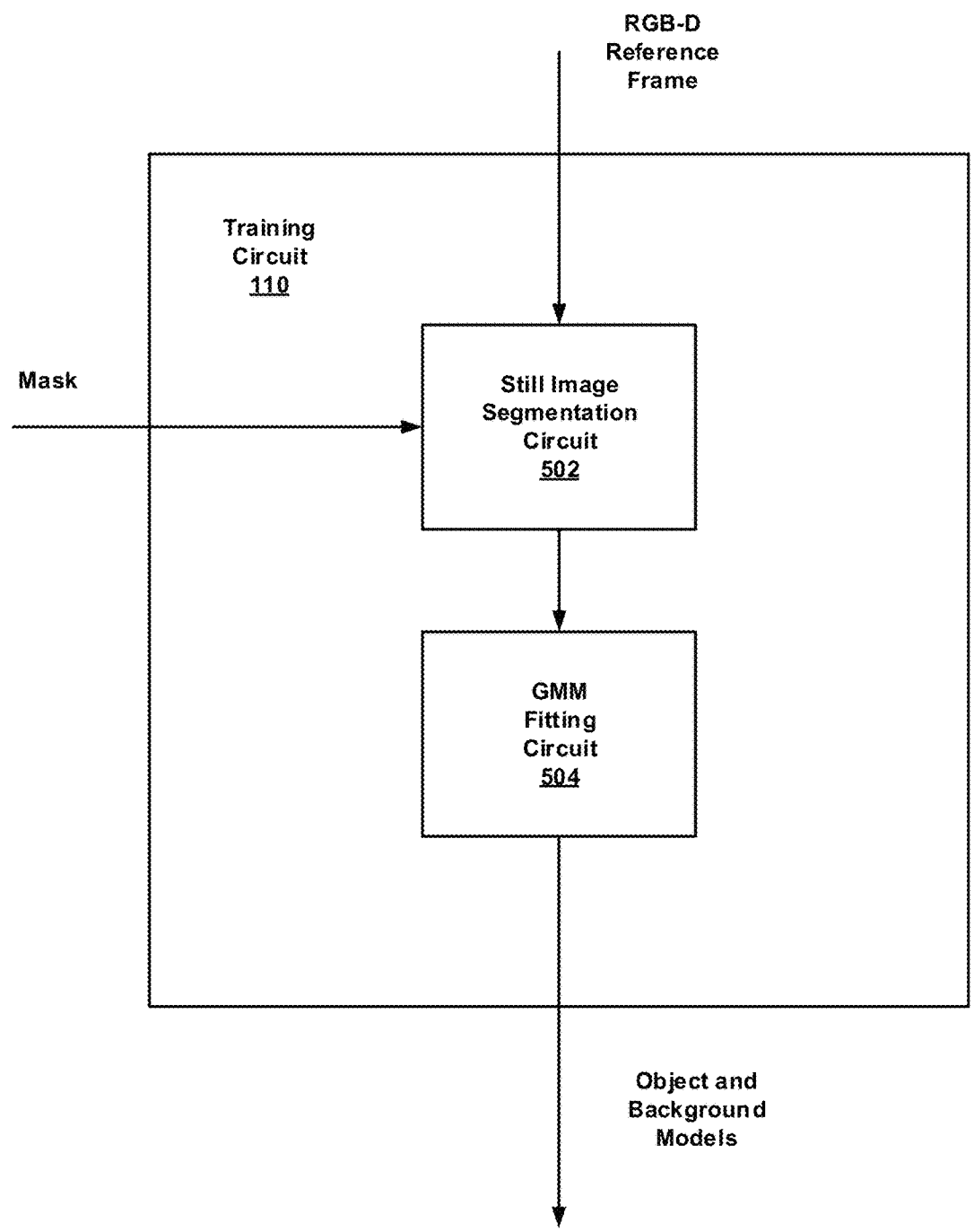
FIG. 5 is a more detailed block diagram of a training circuit, configured in accordance with certain embodiments of the present disclosure.

FIG. 5 is a more detailed block diagram of a training circuit 110, configured in accordance with certain embodiments of the present disclosure. The training circuit 110 is shown to include a still image segmentation circuit 502 and a Gaussian Mixture Model (GMM) fitting circuit 504. The training circuit 110 is configured to generate statistical models for color and depth of both the masked object and the background (non-masked regions) of the reference image frame.

Figure 6:
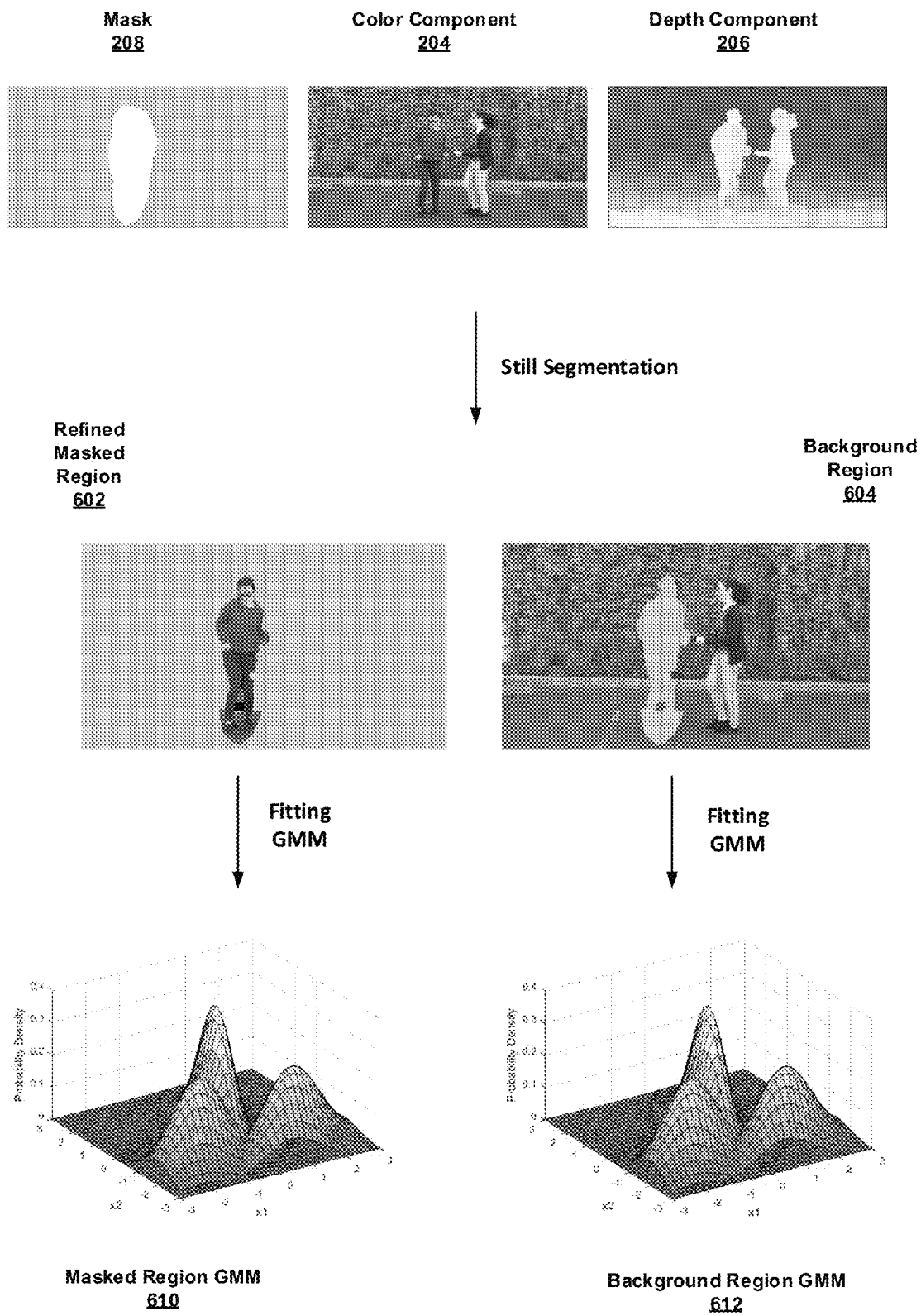
FIG. 6 illustrates example images associated with stages of the training process, in accordance with certain embodiments of the present disclosure.

In more detail, and with reference to FIGS. 5 and 6, the initial mask 208 provides a coarse outline of the object to be segmented from the background in the reference frame RGB and depth components 204, 206. Although the mask 208 does not exactly match the object's shape it provides a starting point for the training process. The still image segmentation circuit 502 may be configured to refine the object boundary and generate a refined masked region 602 and background region 604. In some embodiments, the still image segmentation circuit 502 generates the refined mask region 602 using known techniques in light of the present disclosure.

The Gaussian Mixture Model (GMM) fitting circuit 504 may be configured to fit single channel Gaussian mixture models to the depth frame components and to fit multivariate Gaussian mixture models to the color frame components using self-adaptive techniques as will be described below. Since the RGB color space is highly correlated, a full covariance matrix would be required to model that color space. Thus, in some embodiments, a luminance/chrominance (YCbCr) color space is used, which can be modeled with a diagonal covariance matrix for computational efficiency.

The GMM fitting is based on Expectation Maximization as follows. The pixels in the reference image data set belong to either the object or the background and are assumed to be drawn from a Gaussian mixture which contains N components. Each component k represent a Gaussian distribution with weight $\pi_k$, mean $a_k$, and covariance matrix $S_k$, so the likelihood or probability of any data point i (associated with feature vector $x_i$) is:

$$p(x_i) = \sum_{k=1}^{N} \pi_k \left( \frac{1}{(2\pi)^{\frac{d}{2}} |S_k|^{\frac{1}{2}}} \exp\left\{ -\frac{1}{2}(x_i - a_k)^T S_k^{-1} (x_i - a_k) \right\} \right)$$

where the feature vector corresponds to the pixel color when fitting the color model and to the pixel depth when fitting the depth model. The d term represents the variate or number of Gaussians to be fitted (e.g., for depth d=1, for color d>2). The likelihood of the entire data set X (assuming m points) will be:

$$P(X) = \prod_{i=1}^{m} p(x_i)$$

Expectation Maximization attempts to fit the GMM (i.e., estimate the values of $\pi_k$, $a_k$, and $S_k$) by maximizing $P(X)$, through an iterative process. The choice of N is important to ensure discriminative yet generalizable models without over or under-fitting. Two techniques may be used to select the number of Gaussian distributions N: (1) minimum weight and (2) Bayesian information criteria (BIC). These techniques evaluate whether a model generated by Expectation Maximization is reasonable.

For the minimum weight approach, there is an expectation that the minimum weight should be larger than a specified threshold, that is:

$$\min(\pi_k) \geq \text{min weight threshold}$$

Starting from a predefined value of N, the fitting process is applied and, if the generated model does not meet this criterion, the value of N is decreased and the fitting is repeated until the minimum weight criteria is reached or until there are only 2 Gaussian distributions.

For the BIC approach, the process is iterated for N=N1 to N2 (where N2>N1), and a value for N is chosen corresponding to the iteration that generates the minimum BIC value.

The resulting GMM color fittings for the masked region and the background region may be visualized as multivariate probability density functions (PDFs), examples of which are illustrated as 610 and 612. Similar PDFs may be produced for the GMM depth fittings for the masked region and the background region, although they will be univariate PDFs.

In some embodiments, K-means clustering techniques may be used as an alternative to GMM fitting, to model the object and background of the reference frame.

Figure 7:
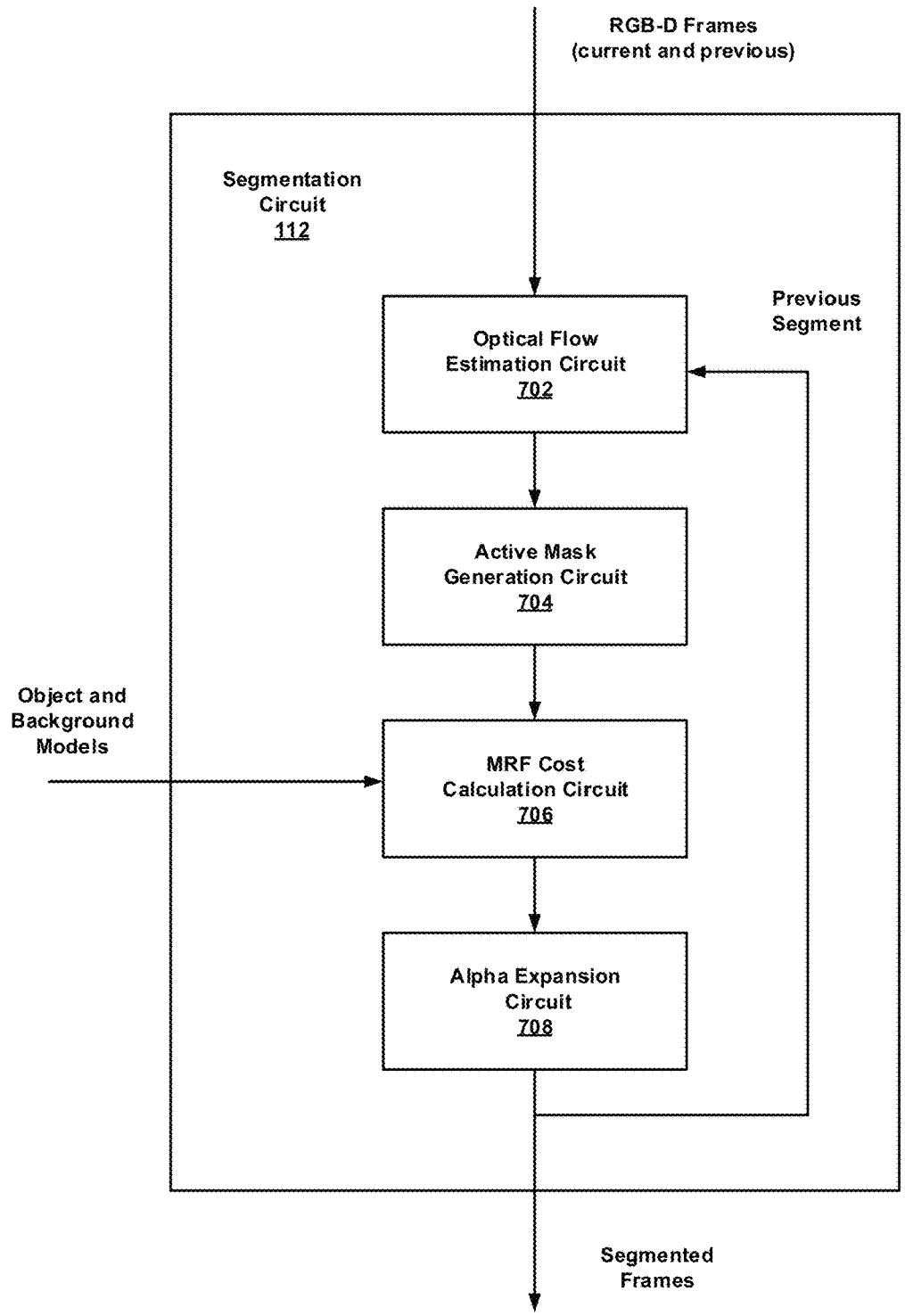
FIG. 7 is a more detailed block diagram of an image segmentation circuit, configured in accordance with certain embodiments of the present disclosure.

FIG. 7 is a more detailed block diagram of an image segmentation circuit 112, configured in accordance with certain embodiments of the present disclosure. The image segmentation circuit 112 is configured to exploit object consistency between frames to determine an "active area" in each frame, and to limit the subsequent segmentation computations to that active area, thus reducing computational burden and memory requirements. The image segmentation circuit 112 is further configured to apply of a 2-label (e.g., object/background) segmentation technique to the active area. The 2-label segmentation technique is based on modelling of pixels as Markov Random Field (MRF) nodes subject to cost minimization using alpha-expansion, as will be explained below. The image segmentation circuit 112 is shown to include an optical flow estimation circuit 702, an active mask generation circuit 704, an MRF cost calculation circuit 706, and an alpha expansion circuit 708.

Figure 8:
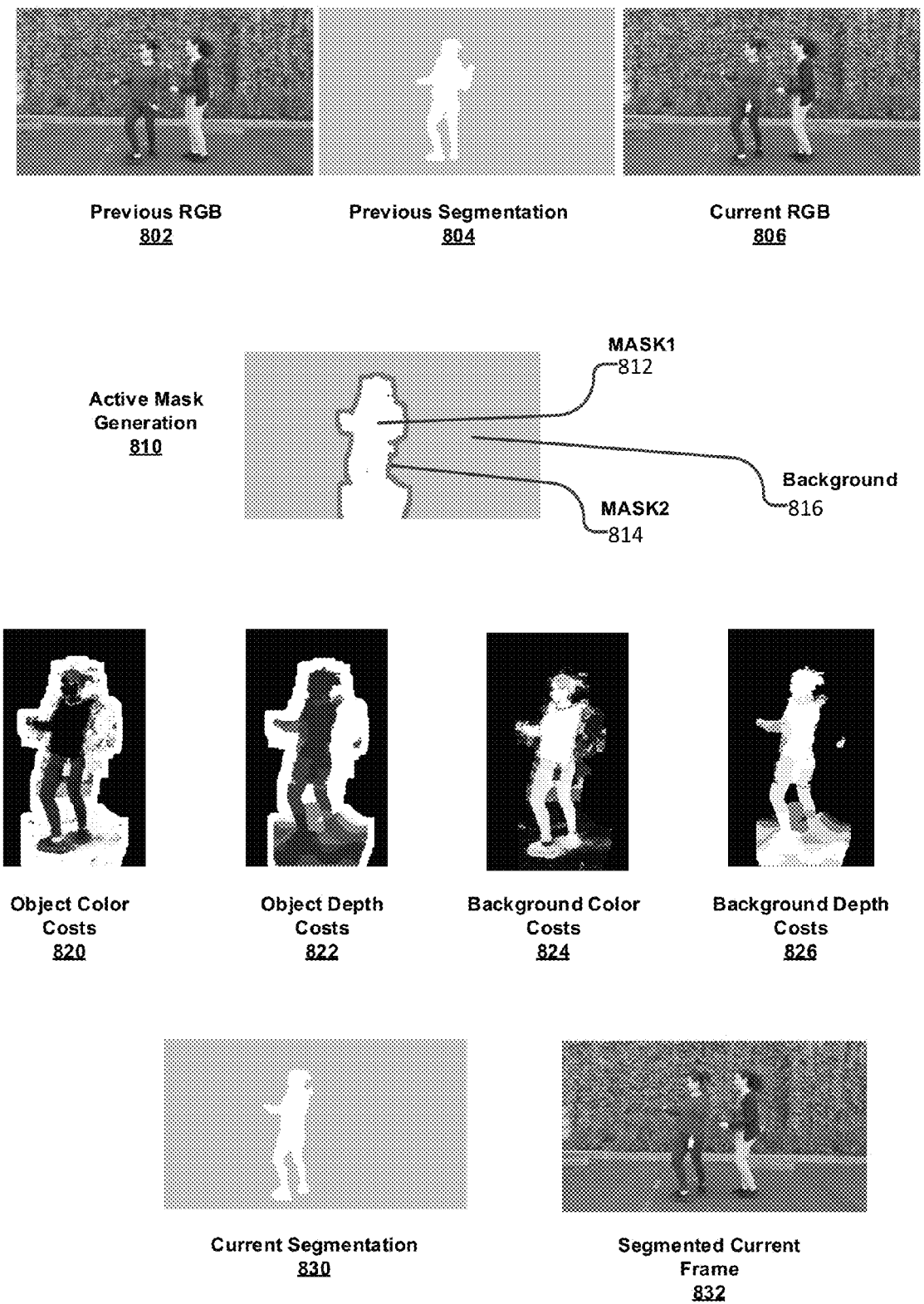
FIG. 8 illustrates example images associated with stages of the segmentation process, in accordance with certain embodiments of the present disclosure.

In more detail, and with reference to FIGS. 7 and 8, the optical flow estimation circuit 702 may be configured to calculate an optical flow map between a previous frame 802 and the current frame 806. The optical flow map $F_{N \to N+1}$, is a set of vectors that map pixels (x,y) of frame N to pixels (x',y') of frame N+1. For each pixel (x,y) in $F_N$, the corresponding pixel (x',y') in $F_{N+1}$ is given by:

$$x' = x + F_{N \to N+1}(x,y).x$$

$$y' = y + F_{N \to N+1}(x,y).y$$

where ".x" indicates the x component of the flow vector and ".y" indicates the y component of the flow vector. The optical flow map may be calculated using know techniques in light of the present disclosure.

The active mask generation circuit 704 may be configured to generate, for the current image frame 806, a mask of the "active area" within which the object to be segmented is likely to be located. This is illustrated as "active mask generation" 810 of FIG. 8. The mask provides a coarse estimate of the object's current position and shape. Generation of the mask is based on application of the optical flow (between the previous frame and the current frame) to the segmentation results 804 of the previous frame. This may be accomplished by transferring the segmentation result label (e.g., object or background) of pixel (x,y) in the previous frame to (x',y') in current frame. The resulting (x',y') pixels which are labeled as object may be grouped together to form an initial estimate of the active area. In some embodiments, this initial active area estimate is expanded by a small margin, to account for error in the optical flow based estimate. The amount of expansion is selectable and, in some embodiments may be performed by morphological dilation or other known techniques in light of the present disclosure. The resulting active area is defined by MASK1 812 which is illustrated as the interior white region of 810.

In some embodiments, an additional expansion is performed to generate MASK2 814, which defines a region surrounding MASK1. MASK2 is illustrated by the darker gray marking of 810. MASK2 814 thus separates MASK1 812 from the background 816 (indicated by the lighter gray region).

Pixels inside the MASK1 region of the current frame are potentially associated with the object to be segmented and will be labeled (as object or background) by the MRF based segmentation technique described below. Pixels inside the MASK2 region are considered "background support pixels" which provide aid during that labeling process, as will also be described. The combination of the MASK1 and MASK2 regions contain the active pixels for subsequent processing. Pixels in the background region 816 are not associated with the object and are not included in the remaining computations.

The MRF cost calculation circuit 706 may be configured to calculate costs for the active pixels. For each pixel, a cost is calculated for labeling that pixel as the object and a second cost is calculated for labeling that pixel as the background. The calculation of object label cost and background label cost are similar, and the following description will focus on the object label cost. Minimization of these costs will determine the label to be applied to the pixel.

In some embodiments, there are a number of independent types of costs that may be used. These include data costs (for color and depth), history costs (based on temporal smoothness), mask costs (based on location of pixel relative to mask), and spatial smoothness costs. In some embodiments, the costs may be normalized to the range of 0 to 1, where 0 is a low cost and 1 is a high cost.

For pixels in the MASK1 region 812, the object label cost is a weighted average of color cost $C_{color}$, depth cost $C_{depth}$, history cost $C_{hist}$, and mask cost $C_{mask}$:

$$C = w_{color}C_{color} + w_{depth}C_{depth} + w_{hist}C_{hist} + w_{mask}C_{mask}$$

where $w_{color} + w_{depth} + w_{hist} + w_{mask} = 1$.

The color cost is based on the color GMMs calculated by training circuit 110 for the object and the background. For each pixel i, a probability, $p_{obj}(i)$, is calculated that the pixel is associated with the object, based on the masked region GMM 610. A similar probability, $p_{bg}(i)$, is calculated that the pixel is associated with the background, based on the background region GMM 612. The color cost for the object label is calculated as:

$$\begin{cases} \text{sum} = p_{obj}(i) + p_{bg}(i) \\ C_{color} = 1 - \dfrac{p_{obj}(i)}{\text{sum}} \end{cases}$$

In this manner, the higher a pixel's likelihood is to the object GMM, the lower its object cost. The depth cost $C_{depth}$ is calculated in the same way, using the depth GMMs.

The history cost is based on a history mask that represents temporal inconsistencies, in depth or color, between frames. Most natural objects of interest exhibit relatively smooth changes between consecutive frames in a typical 30-60 frame per second (fps) capture. The history cost exploits this temporal smoothness to help determine object and background labels.

A history mask $H_N$ is calculated as follows and updated as each current frame is processed. For a frame N with corresponding segmentation result $S_N$ (e.g., a binary image with the value 0 representing background pixels and the value 255 representing object pixels), the history mask may be calculated as:

$$\begin{cases} H_1 = S_1 \\ H_N = \text{alpha} \times H_{N-1} + (1 - \text{alpha}) \times S_N, N \geq 2 \end{cases}$$

where alpha is a pre-determined scalar in the range of 0 to 1.0. In some embodiments, alpha may preferably be in the range of 0.5 to 0.7. In other words, for the first frame the history mask is initialized to the segmentation result. For each consecutive frame, the history map is updated with a weighted combination of the previous history map and the current segmentation result. Thus, the history map is weighted more heavily towards pixels associated with object labels in the most recent frames, while the importance of older frames is gradually reduced over time.

The history cost for an object label for pixel i in frame N is calculated as:

$$C_{hist} = 1 - \dfrac{H_N(i)}{255}$$

The history cost for a background label for that same pixel is $C'_{hist} = 1 - C_{hist}$.

The mask cost is based on pixel location within the active area mask MASK1 812. Pixels that are further away from the boundary of MASK1 (e.g., deeper within the active area mask), have a higher likelihood of being associated with the object of interest and therefore a lower cost (e.g., closer to 0). Thus, for a pixel i, the mask cost $C_{mask}$ for an object label is calculated as:

$$C_{mask} = 1 - \dfrac{\text{location\_weight}(i)}{255}$$

where location_weight ranges from 0, for pixels closest to the mask boundary, to 255, for pixels farthest from the mask boundary.

For the "background support pixels" in the MASK2 region 814, the costs are simply set as follows:

$$\begin{cases} C_{object} = 1 \\ C_{background} = 0 \end{cases}$$

The spatial smoothness costs are based on a measure of similarity between neighboring pixels. The more similar two neighboring pixels are (in depth and/or color), the greater the smoothness cost will be, making it more likely that they will be assigned the same label, whether object or background. Any suitable measure of similarity may be employed in light of the present disclosure.

FIG. 8 further provides example illustrations of object color costs 820, object depth costs 822, background color costs, and background depth costs 826, within the MASK1 and MASK2 regions. In these examples black represents the lowest cost 0 and white represents the highest cost 1.

The alpha expansion circuit 708 may be configured to minimize the above MRF costs, so that object and background labels can be assigned to pixels or groups of pixels in the current frame, to segment the object of interest. The MRF costs may be minimized using Graph Cuts or other known techniques, in light of the present disclosure. In some embodiments, pixels with similar data costs and/or spatial smoothness costs may be merged into blocks that are mapped to MRF nodes for the Graph Cut process. Such merging may reduce computational requirements. Additionally, in some embodiments, the MRF nodes may be organized into a hierarchical tree structure such that the Graph Cut process may be applied to groups of nodes in parallel branches of the tree in, a parallel fashion, for example using multi-threaded processing, to further reduce computational requirements.

Methodology

Figure 9:
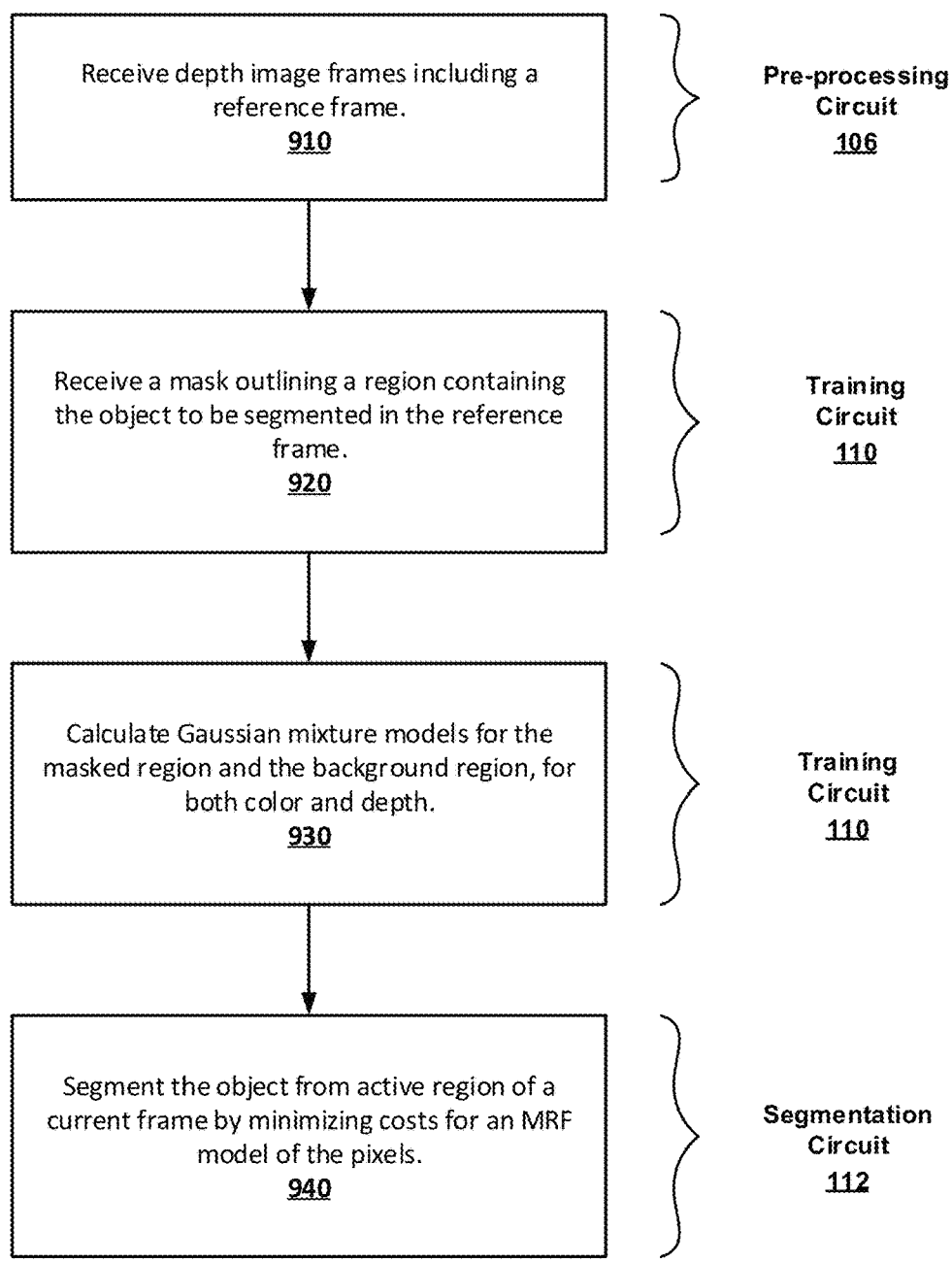
FIG. 9 is a flowchart illustrating a methodology for segmentation of objects in depth videos, in accordance with certain embodiments of the present disclosure.

FIG. 9 is a flowchart illustrating an example method 900 for segmentation of objects, in videos comprising a sequence of color and depth image frames generated by a depth camera, in accordance with certain embodiments of the present disclosure. As can be seen, example method 900 includes a number of phases and sub-processes, the sequence of which may vary from one embodiment to another. However, when considered in the aggregate, these phases and sub-processes form a process for object segmentation in accordance with certain of the embodiments disclosed herein. These embodiments can be implemented, for example using the system architecture illustrated in FIGS. 1, 4, 5, and 7 described above. However other system architectures can be used in other embodiments, as will be apparent in light of this disclosure. To this end, the correlation of the various functions shown in FIG. 9 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 900. Thus other embodiments may have fewer or more modules and/or sub-modules depending on the granularity of implementation. Numerous variations and alternative configurations will be apparent in light of this disclosure.

As illustrated in FIG. 9, in one embodiment, method 900 for object segmentation commences by receiving, at operation 910, a plurality of image frames that include a reference frame. The reference frame may be the first image frame in the video sequence, although this is not required. The image frames may be provided by a depth camera 104 such that they include both color (e.g., RGB) pixels and depth pixels. In some embodiments, the pre-processing circuit 106 is configured to perform this operation.

Next, at operation 920, a user specified mask is received. The mask outlines a region in the reference image frame that contains the object to be segmented. The mask thus provides a relatively coarse approximation of the location and boundary of the object which will be used as a starting point in the segmentation process. The mask also defines a background region of the reference image frame that includes the area external to the mask. In some embodiments, the mask is received by training circuit 110 from user interface 108. At operation 930, GMMs are calculated for each of the color frame components and the depth frame components of both the masked region and the background region. In some embodiments, the models are calculated by training circuit 110.

At operation 940, the object is segmented from a current image frame based on a modelling of the pixels within an active area of the current frame as a Markov Random Field of nodes to which cost minimization is applied. The costs are based in part on the GMMs. The active area is based on the segmentation results of a previous image frame and on an estimation of the optical flow between the previous frame and the current frame. In some embodiments, the segmentation circuit 112 is configured to perform the MRF modelling, cost minimization and active area determination to generate the object segment.

Of course, in some embodiments, additional operations may be performed, as previously described in connection with the system. These additional operations may include, for example, performing pre-filtering on the color and depth image frame components to reduce noise. Further additional operations may include, calculating additional costs for the MRF model cost minimization. These additional costs may include a temporal smoothness cost, a spatial smoothness cost, and a location cost, as previously described.

Example System

Figure 10:
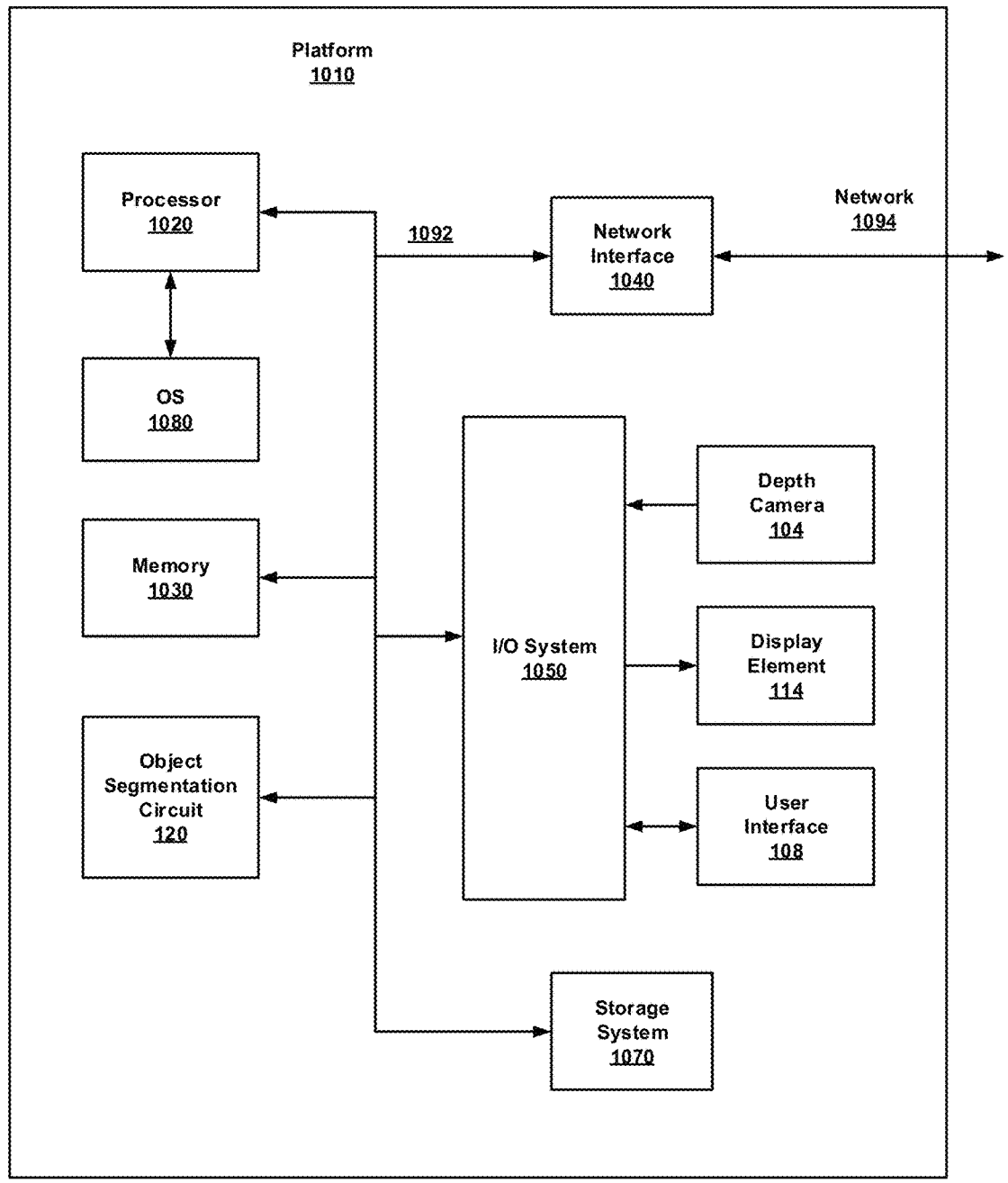
FIG. 10 is a block diagram schematically illustrating a system platform to perform object segmentation in depth videos, configured in accordance with certain embodiments of the present disclosure.

FIG. 10 illustrates an example system 1000 to perform segmentation of objects, in videos that include color and depth information, configured in accordance with certain embodiments of the present disclosure. In some embodiments, system 1000 comprises a platform 1010 which may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, and so forth. Any combination of different devices may be used in certain embodiments.

In some embodiments, platform 1010 may comprise any combination of a processor 1020, a memory 1030, object segmentation circuit 120, a network interface 1040, an input/output (I/O) system 1050, a depth camera 104, a display element 114, a user interface 108 and a storage system 1070. As can be further seen, a bus and/or interconnect 1092 is also provided to allow for communication between the various components listed above and/or other components not shown. Platform 1010 can be coupled to a network 1094 through network interface 1040 to allow for communications with other computing devices, platforms or resources. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor or a graphics processing unit, to assist in control and processing operations associated with system 1000. In some embodiments, the processor 1020 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor. In some embodiments, processor 1020 may be configured as an x86 instruction set compatible processor.

Memory 1030 can be implemented using any suitable type of digital storage including, for example, flash memory and/or random access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 1000, and therefore may also be implemented using any suitable existing or subsequently-developed platform.

Network interface circuit 1040 can be any appropriate network chip or chipset which allows for wired and/or wireless connection between other components of computer system 1000 and/or network 1094, thereby enabling system 1000 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1050 may be configured to interface between various I/O devices and other components of computer system 1000. I/O devices may include, but not be limited to, a depth camera 104, a display element 114, and other devices not shown such as a keyboard, mouse, microphone, speaker, etc.

I/O system 1050 may include a graphics subsystem configured to perform processing of images for display element 114. Graphics subsystem may be a graphics processing unit or a visual processing unit (VPU), for example. An analog or digital interface may be used to communicatively couple graphics subsystem and display element 114. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1020 or any chipset of platform 1010. In some embodiments, display element 114 may comprise any television type monitor or display. Display element 114 may comprise, for example, a computer display screen, touchscreen display, video monitor, television-like device, and/or a television. Display element 114 may be digital and/or analog. Under the control of the OS 1080 (or one or more software applications), platform 1010 may display images and detection results on display element 114. The images may be provided by depth camera 104 and the segmentation results may be provided by object segmentation circuit 120, as described herein.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

Object segmentation circuit 120 is configured to perform segmentation of objects, in videos comprising a sequence of color and depth image frames. The image frames may be provided by depth camera 104. Object segmentation circuit 120 may include any or all of the components illustrated in FIGS. 1, 4, 5, and 7 as described above. Object segmentation circuit 120 can be implemented or otherwise used in conjunction with a variety of suitable software and/or hardware that is coupled to or that otherwise forms a part of platform 1010. Object segmentation circuit 120 can additionally or alternatively be implemented or otherwise used in conjunction with user I/O devices that are capable of providing information to, and receiving information and commands from, a user. These I/O devices may include display element 114, and other devices collectively referred to as user interface 108. In some embodiments, user interface 108 may include a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments, object segmentation circuit 120 may be installed local to system 1000, as shown in the example embodiment of FIG. 10. Alternatively, system 1000 can be implemented in a client-server arrangement wherein at least some functionality associated with these circuits is provided to system 1000 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 1094 or remotely coupled to network 1094 by one or more other networks and/or communication channels. In some cases access to resources on a given network or computing system may require credentials such as usernames, passwords, and/or compliance with any other suitable security mechanism.

In various embodiments, system 1000 may be implemented as a wireless system, a wired system, or a combination of both. When implemented as a wireless system, system 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the object segmentation methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1094. In other embodiments the functionalities disclosed herein can be incorporated into other software applications, such as video editing applications, video analysis applications, video surveillance applications, or other content generation, modification, and/or management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1000 may comprise additional, fewer, or alternative subcomponents as compared to those included in the example embodiment of FIG. 10.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for object segmentation, comprising: receiving, by a processor, a plurality of image frames, each comprising a color frame component and a depth frame component, wherein one of the image frames is a reference image frame; receiving, by the processor, a mask to outline a region, in the reference image frame, containing an object to be segmented; calculating, by the processor, a first set of Gaussian mixture models associated with the masked region and a second set of Gaussian mixture models associated with a background region, the background region external to the masked region, the first and second sets of Gaussian mixture models each comprising a model based on the color frame component and a model based on the depth frame component; and segmenting, by the processor, the object, from a current frame of the image frames, based on modelling of pixels within an active area of the current frame as a Markov Random Field (MRF) of nodes for cost minimization, wherein the costs are based on the Gaussian mixture models, and the active area is based on segmentation of a previous frame of the image frames and on an optical flow estimation between the previous frame and the current frame.

Example 2 includes the subject matter of Example 1, further comprising: applying a blurring filter and a mean shifting filter to the color frame components of the image frames; applying a speckle noise filter to the depth frame components of the image frames; determining confidence values associated with pixels of the depth frame components of the image frames; and labeling pixels, of the depth frame components of the image frames, associated with confidence values below a threshold value, the label to indicate an unknown depth.

Example 3 includes the subject matter of Examples 1 or 2, wherein the Gaussian mixture model calculation is based on single channel Gaussian Mixture Model (GMM) fitting applied to the depth frame components and on a multivariate GMM fitting applied to the color frame components.

Example 4 includes the subject matter of any of Examples 1-3, wherein the costs further comprise a history cost based on a measure of temporal smoothness of pixels between the image frames.

Example 5 includes the subject matter of any of Examples 1-4, wherein the costs further comprise a location cost based on the location of a pixel relative to the active area.

Example 6 includes the subject matter of any of Examples 1-5, wherein the costs further comprise a spatial smoothness cost based on a measure of spatial smoothness between neighboring pixels, the smoothness measure based on a calculation of difference between color values and depth values of the neighboring pixels.

Example 7 includes the subject matter of any of Examples 1-6, further comprising modelling the pixels as MRF nodes by merging pixels with similar costs into the same MRF node, wherein cost similarity is determined by comparison of a difference in cost between pixels to a threshold value.

Example 8 includes the subject matter of any of Examples 1-7, further comprising extracting the reference image frame, the current image frame, and the previous image frame from a Red-Green-Blue-Depth (RGB-D) video sequence received from a depth camera at a frame rate in the range of 20 to 60 frames per second.

Example 9 is a system for object segmentation, comprising: a pre-processing circuit to receive a plurality of image frames, each comprising a color frame component and a depth frame component, wherein one of the image frames is a reference image frame; a training circuit to receive a mask to outline a region, in the reference image frame, containing an object to be segmented, the training circuit further to calculate a first set of Gaussian mixture models associated with the masked region and a second set of Gaussian mixture models associated with a background region, the background region external to the masked region, the first and second sets of Gaussian mixture models each comprising a model based on the color frame component and a model based on the depth frame component; and a segmentation circuit to segment the object, from a current frame of the image frames, based on modelling of pixels within an active area of the current frame as a Markov Random Field (MRF) of nodes for cost minimization, wherein the costs are based on the Gaussian mixture models, and the active area is based on segmentation of a previous frame of the image frames and on an optical flow estimation between the previous frame and the current frame.

Example 10 includes the subject matter of Example 9, wherein the pre-processing circuit further comprises: a Gaussian blur filter circuit to reduce noise in the color frame components of the image frames; a mean shifting filter circuit to quantize the color space of the color frame components of the image frames; a speckle noise filter to reduce noise in the depth frame components of the image frames; and a pixel confidence labeling circuit to determine confidence values associated with pixels of the depth frame components of the image frames and to label pixels of the depth frame components that are associated with confidence values below a threshold value, the label to indicate an unknown depth.

Example 11 includes the subject matter of Examples 9 or 10, wherein the training circuit further comprises a Gaussian Mixture Model (GMM) fitting circuit to fit single channel Gaussian mixture models to the depth frame components and to fit multivariate Gaussian mixture models to the color frame components.

Example 12 includes the subject matter of any of Examples 9-11, wherein the costs further comprise a history cost based on a measure of temporal smoothness of pixels between the image frames.

Example 13 includes the subject matter of any of Examples 9-12, wherein the costs further comprise a location cost based on the location of a pixel relative to the active area.

Example 14 includes the subject matter of any of Examples 9-13, wherein the costs further comprise a spatial smoothness cost based on a measure of spatial smoothness between neighboring pixels, the smoothness measure based on a calculation of difference between color values and depth values of the neighboring pixels.

Example 15 includes the subject matter of any of Examples 9-14, wherein the segmentation circuit further comprises an alpha expansion circuit to merge pixels with similar costs into the same MRF node, wherein cost similarity is determined by comparison of a difference in cost between pixels to a threshold value.

Example 16 includes the subject matter of any of Examples 9-15, wherein the pre-processing circuit is further to extract the reference image frame, the current image frame, and the previous image frame from a Red-Green-Blue-Depth (RGB-D) video sequence received from a depth camera at a frame rate in the range of 20 to 60 frames per second.

Example 17 includes the subject matter of any of Examples 9-16, wherein the system is a mobile computing device.

Example 18 is at least one non-transitory computer readable storage medium having instructions encoded thereon that, when executed by one or more processors, result in the following operations for object segmentation, the operations comprising: receiving a plurality of image frames, each comprising a color frame component and a depth frame component, wherein one of the image frames is a reference image frame; receiving a mask to outline a region, in the reference image frame, containing an object to be segmented; calculating a first set of Gaussian mixture models associated with the masked region and a second set of Gaussian mixture models associated with a background region, the background region external to the masked region, the first and second sets of Gaussian mixture models each comprising a model based on the color frame component and a model based on the depth frame component; and segmenting the object, from a current frame of the image frames, based on modelling of pixels within an active area of the current frame as a Markov Random Field (MRF) of nodes for cost minimization, wherein the costs are based on the Gaussian mixture models, and the active area is based on segmentation of a previous frame of the image frames and on an optical flow estimation between the previous frame and the current frame.

Example 19 includes the subject matter of Example 18, the operations further comprising: applying a blurring filter and a mean shifting filter to the color frame components of the image frames; applying a speckle noise filter to the depth frame components of the image frames; determining confidence values associated with pixels of the depth frame components of the image frames; and labeling pixels, of the depth frame components of the image frames, associated with confidence values below a threshold value, the label to indicate an unknown depth.

Example 20 includes the subject matter of Examples 18 or 19, wherein the Gaussian mixture model calculation is based on single channel Gaussian Mixture Model (GMM) fitting applied to the depth frame components and on a multivariate GMM fitting applied to the color frame components.

Example 21 includes the subject matter of any of Examples 18-20, wherein the costs further comprise a history cost based on a measure of temporal smoothness of pixels between the image frames.

Example 22 includes the subject matter of any of Examples 18-21, wherein the costs further comprise a location cost based on the location of a pixel relative to the active area.

Example 23 includes the subject matter of any of Examples 18-22, wherein the costs further comprise a spatial smoothness cost based on a measure of spatial smoothness between neighboring pixels, the smoothness measure based on a calculation of difference between color values and depth values of the neighboring pixels.

Example 24 includes the subject matter of any of Examples 18-23, the operations further comprising modelling the pixels as MRF nodes by merging pixels with similar costs into the same MRF node, wherein cost similarity is determined by comparison of a difference in cost between pixels to a threshold value.

Example 25 includes the subject matter of any of Examples 18-24, the operations further comprising extracting the reference image frame, the current image frame, and the previous image frame from a Red-Green-Blue-Depth (RGB-D) video sequence received from a depth camera at a frame rate in the range of 20 to 60 frames per second.

Example 26 is a mobile computing device comprising the computer readable storage medium of any of Examples 18-25.

Example 27 is a system for object segmentation, comprising: means for receiving a plurality of image frames, each comprising a color frame component and a depth frame component, wherein one of the image frames is a reference image frame; means for receiving a mask to outline a region, in the reference image frame, containing an object to be segmented; means for calculating a first set of Gaussian mixture models associated with the masked region and a second set of Gaussian mixture models associated with a background region, the background region external to the masked region, the first and second sets of Gaussian mixture models each comprising a model based on the color frame component and a model based on the depth frame component; and means for segmenting the object, from a current frame of the image frames, based on modelling of pixels within an active area of the current frame as a Markov Random Field (MRF) of nodes for cost minimization, wherein the costs are based on the Gaussian mixture models, and the active area is based on segmentation of a previous frame of the image frames and on an optical flow estimation between the previous frame and the current frame.

Example 28 includes the subject matter of Example 27, further comprising: means for applying a blurring filter and a mean shifting filter to the color frame components of the image frames; means for applying a speckle noise filter to the depth frame components of the image frames; means for determining confidence values associated with pixels of the depth frame components of the image frames; and means for labeling pixels, of the depth frame components of the image frames, associated with confidence values below a threshold value, the label to indicate an unknown depth.

Example 29 includes the subject matter of Examples 27 or 28, wherein the Gaussian mixture model calculation is based on single channel Gaussian Mixture Model (GMM) fitting applied to the depth frame components and on a multivariate GMM fitting applied to the color frame components.

Example 30 includes the subject matter of any of Examples 27-29, wherein the costs further comprise a history cost based on a measure of temporal smoothness of pixels between the image frames.

Example 31 includes the subject matter of any of Examples 27-30, wherein the costs further comprise a location cost based on the location of a pixel relative to the active area.

Example 32 includes the subject matter of any of Examples 27-31, wherein the costs further comprise a spatial smoothness cost based on a measure of spatial smoothness between neighboring pixels, the smoothness measure based on a calculation of difference between color values and depth values of the neighboring pixels.

Example 33 includes the subject matter of any of Examples 27-32, further comprising means for modelling the pixels as MRF nodes by merging pixels with similar costs into the same MRF node, wherein cost similarity is determined by comparison of a difference in cost between pixels to a threshold value.

Example 34 includes the subject matter of any of Examples 27-33, further comprising means for extracting the reference image frame, the current image frame, and the previous image frame from a Red-Green-Blue-Depth (RGB-D) video sequence received from a depth camera at a frame rate in the range of 20 to 60 frames per second.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for object segmentation, the method comprising:
   receiving, by a processor, a plurality of image frames, each comprising a color frame component and a depth frame component, wherein one of the image frames is a reference image frame;
   receiving, by the processor, a mask to outline a region, in the reference image frame, containing an object to be segmented;
   calculating, by the processor, a first set of Gaussian mixture models associated with the masked region and a second set of Gaussian mixture models associated with a background region, the background region external to the masked region, the first and second sets of Gaussian mixture models each comprising a model based on the color frame component and a model based on the depth frame component; and
   segmenting, by the processor, the object, from a current frame of the image frames, based on modelling of pixels within an active area of the current frame as a Markov Random Field (MRF) of nodes for cost minimization, wherein the costs are based on the Gaussian mixture models, and the active area is based on segmentation of a previous frame of the image frames and on an optical flow estimation between the previous frame and the current frame.

2. The method of claim 1, further comprising:
   applying a blurring filter and a mean shifting filter to the color frame components of the image frames;
   applying a speckle noise filter to the depth frame components of the image frames;
   determining confidence values associated with pixels of the depth frame components of the image frames; and
   labeling pixels, of the depth frame components of the image frames, associated with confidence values below a threshold value, the label to indicate an unknown depth.

3. The method of claim 1, wherein the Gaussian mixture model calculation is based on single channel Gaussian Mixture Model (GMM) fitting applied to the depth frame components and on a multivariate GMM fitting applied to the color frame components.

4. The method of claim 1, wherein the costs further comprise a history cost based on a measure of temporal smoothness of pixels between the image frames.

5. The method of claim 1, wherein the costs further comprise a location cost based on the location of a pixel relative to the active area.

6. The method of claim 1, wherein the costs further comprise a spatial smoothness cost based on a measure of spatial smoothness between neighboring pixels, the smoothness measure based on a calculation of difference between color values and depth values of the neighboring pixels.

7. The method of claim 1, further comprising modelling the pixels as MRF nodes by merging pixels with similar costs into the same MRF node, wherein cost similarity is determined by comparison of a difference in cost between pixels to a threshold value.

8. The method of claim 1, further comprising extracting the reference image frame, the current image frame, and the previous image frame from a Red-Green-Blue-Depth (RGB-D) video sequence received from a depth camera at a frame rate in the range of 20 to 60 frames per second.

9. A system for object segmentation, the system comprising:
   a pre-processing circuit to receive a plurality of image frames, each comprising a color frame component and a depth frame component, wherein one of the image frames is a reference image frame;
   a training circuit to receive a mask to outline a region, in the reference image frame, containing an object to be segmented, the training circuit further to calculate a first set of Gaussian mixture models associated with the masked region and a second set of Gaussian mixture models associated with a background region, the background region external to the masked region, the first and second sets of Gaussian mixture models each comprising a model based on the color frame component and a model based on the depth frame component; and
   a segmentation circuit to segment the object, from a current frame of the image frames, based on modelling of pixels within an active area of the current frame as a Markov Random Field (MRF) of nodes for cost minimization, wherein the costs are based on the Gaussian mixture models, and the active area is based on segmentation of a previous frame of the image frames and on an optical flow estimation between the previous frame and the current frame.

10. The system of claim 9, wherein the pre-processing circuit further comprises:
    a Gaussian blur filter circuit to reduce noise in the color frame components of the image frames;
    a mean shifting filter circuit to quantize the color space of the color frame components of the image frames;
    a speckle noise filter to reduce noise in the depth frame components of the image frames; and
    a pixel confidence labeling circuit to determine confidence values associated with pixels of the depth frame components of the image frames and to label pixels of the depth frame components that are associated with confidence values below a threshold value, the label to indicate an unknown depth.

11. The system of claim 9, wherein the training circuit further comprises a Gaussian Mixture Model (GMM) fitting circuit to fit single channel Gaussian mixture models to the depth frame components and to fit multivariate Gaussian mixture models to the color frame components.

12. The system of claim 9, wherein the costs further comprise a history cost based on a measure of temporal smoothness of pixels between the image frames.

13. The system of claim 9, wherein the costs further comprise a location cost based on the location of a pixel relative to the active area.

14. The system of claim 9, wherein the costs further comprise a spatial smoothness cost based on a measure of spatial smoothness between neighboring pixels, the smoothness measure based on a calculation of difference between color values and depth values of the neighboring pixels.

15. The system of claim 9, wherein the segmentation circuit further comprises an alpha expansion circuit to merge pixels with similar costs into the same MRF node, wherein cost similarity is determined by comparison of a difference in cost between pixels to a threshold value.

16. The system of claim 9, wherein the pre-processing circuit is further to extract the reference image frame, the current image frame, and the previous image frame from a Red-Green-Blue-Depth (RGB-D) video sequence received from a depth camera at a frame rate in the range of 20 to 60 frames per second.

17. At least one non-transitory computer readable storage medium having instructions encoded thereon that, when executed by one or more processors, result in the following operations for object segmentation, the operations comprising:
    receiving a plurality of image frames, each comprising a color frame component and a depth frame component, wherein one of the image frames is a reference image frame;
    receiving a mask to outline a region, in the reference image frame, containing an object to be segmented;
    calculating a first set of Gaussian mixture models associated with the masked region and a second set of Gaussian mixture models associated with a background region, the background region external to the masked region, the first and second sets of Gaussian mixture models each comprising a model based on the color frame component and a model based on the depth frame component; and
    segmenting the object, from a current frame of the image frames, based on modelling of pixels within an active area of the current frame as a Markov Random Field (MRF) of nodes for cost minimization, wherein the costs are based on the Gaussian mixture models, and the active area is based on segmentation of a previous frame of the image frames and on an optical flow estimation between the previous frame and the current frame.

18. The computer readable storage medium of claim 17, the operations further comprising:
    applying a blurring filter and a mean shifting filter to the color frame components of the image frames;
    applying a speckle noise filter to the depth frame components of the image frames;
    determining confidence values associated with pixels of the depth frame components of the image frames; and
    labeling pixels, of the depth frame components of the image frames, associated with confidence values below a threshold value, the label to indicate an unknown depth.

19. The computer readable storage medium of claim 17, wherein the Gaussian mixture model calculation is based on single channel Gaussian Mixture Model (GMM) fitting applied to the depth frame components and on a multivariate GMM fitting applied to the color frame components.

20. The computer readable storage medium of claim 17, wherein the costs further comprise a history cost based on a measure of temporal smoothness of pixels between the image frames.

21. The computer readable storage medium of claim 17, wherein the costs further comprise a location cost based on the location of a pixel relative to the active area.

22. The computer readable storage medium of claim 17, wherein the costs further comprise a spatial smoothness cost based on a measure of spatial smoothness between neighboring pixels, the smoothness measure based on a calculation of difference between color values and depth values of the neighboring pixels.

23. The computer readable storage medium of claim 17, the operations further comprising modelling the pixels as MRF nodes by merging pixels with similar costs into the same MRF node, wherein cost similarity is determined by comparison of a difference in cost between pixels to a threshold value.

24. The computer readable storage medium of claim 17, the operations further comprising extracting the reference image frame, the current image frame, and the previous image frame from a Red-Green-Blue-Depth (RGB-D) video sequence received from a depth camera at a frame rate in the range of 20 to 60 frames per second.

25. A mobile computing device comprising the computer readable storage medium of claim 17.

* * * * *